(12) United States Patent
McMillan (10) Patent No.: US 9,998,327 B2
(45) Date of Patent: Jun. 12, 2018

(54) CONFIGURATION INFORMATION TRANSFER WITH A MOBILE DEVICE

(71) Applicant: International Business Machines Corporation, Armonk, NY (US)

(72) Inventor: Craig D. McMillan, Regina (CA)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/927,145

(22) Filed: Jun. 26, 2013

(65) Prior Publication Data

US 2015/0006686 A1 Jan. 1, 2015

(51) Int. Cl.
G06F 15/177 (2006.01)
H04L 12/24 (2006.01)

(52) U.S. Cl.
CPC ...... H04L 41/0813 (2013.01); H04L 41/0843 (2013.01)

(58) Field of Classification Search
CPC ... H04L 67/28; H04L 67/303; H04L 63/0492; H04L 63/18; H04L 41/084; H04L 41/0846; H04L 12/2803–12/2838; G06F 12/1408; G06F 12/1416; H04W 4/24; H04W 4/26
USPC .................................................. 709/221, 219
See application file for complete search history.

(56) References Cited

U.S. PATENT DOCUMENTS

| | | | |
|---|---|---|---|
| 7,200,650 B2 | 4/2007 | Patton et al. | |
| 2003/0120761 A1 | 6/2003 | Patton et al. | |
| 2005/0149758 A1* | 7/2005 | Park | H04L 9/3236 726/4 |
| 2007/0207789 A1* | 9/2007 | Zellner | G06Q 30/04 455/415 |
| 2009/0175426 A1 | 7/2009 | Beyer et al. | |
| 2011/0053574 A1* | 3/2011 | Rice | H04M 1/006 455/418 |
| 2012/0221639 A1* | 8/2012 | Mallet | G06Q 50/01 709/204 |
| 2012/0284631 A1 | 11/2012 | Lancioni et al. | |
| 2013/0047233 A1* | 2/2013 | Fisk | G06F 21/6245 726/7 |
| 2013/0179565 A1* | 7/2013 | Hart | H04L 41/0893 709/224 |
| 2014/0222864 A1* | 8/2014 | Runge | G06F 17/30545 707/770 |
| 2015/0088337 A1* | 3/2015 | Toohy | B60R 16/037 701/1 |

FOREIGN PATENT DOCUMENTS

| | | |
|---|---|---|
| CN | 1720542 A | 1/2006 |
| CN | 102043404 A | 5/2011 |

\* cited by examiner

Primary Examiner — Larry Donaghue
Assistant Examiner — Patrick Ngankam
(74) Attorney, Agent, or Firm — Christopher McLane; Maeve M. Carpenter; Jason H. Sosa (57) ABSTRACT

A mobile computing device queries a compatible device for identification information. Based on the identification information, the mobile computing device determines a family of devices, from a plurality of families, to which the compatible device belongs. Based on the determination of the device family, the mobile computing device determines one or more parameters that can be configured on the compatible device. Finally, the mobile computing device sends one or more stored values corresponding to the one or more configurable parameters to the compatible device.

17 Claims, 5 Drawing Sheets

CONFIGURATION INFORMATION TRANSFER WITH A MOBILE DEVICE

FIELD OF THE INVENTION

The present invention relates generally to the field of data management, and more particularly to managing configuration data with a mobile electronic device.

BACKGROUND OF THE INVENTION

Mobile computing devices that remain on or near a user have become prevalent in today's culture. An exemplary list of such mobile devices includes cellular phones, smart phones, tablets, electronic watches, and even smart computer chips on credit cards. Mobile devices are often capable of storing a great deal of data and/or accessing data on a network via a wireless connection, such as a Wi-Fi® connection or a cellular connection.

Additionally, multitudes of electronic devices surround us in many of our day to day activities, from computers to vending machines to ATMs and even to the cars we drive. The computing capabilities of these electronic devices continue to progress at a rapid pace. Many of these electronic devices contain at least some base form of one or more processors, storage devices and memory, and even communication functionality. Some of these electronic devices can be configured with a user's personal preferences for a variety of settings.

It is known that electronic devices, including mobile computing devices, may scan for and communicate directly with one another. For example, Bluetooth® technology is known today to enable two-way, wireless communication for exchanging data over short distances. Bluetooth® technology makes use of radio transmissions and can communicate between fixed and mobile devices. Other wireless solutions are available to connect devices in close proximity.

SUMMARY

Embodiments of the present invention disclose a method, computer program product, and system. A mobile computing device queries a first device for identification information. Based on the identification information, the mobile computing device determines a family of devices, from a plurality of families, to which the compatible device is a member. Based on the determination of the device family, the mobile computing device determines one or more parameters that can be configured on the compatible device. Finally, the mobile computing device sends one or more stored values corresponding to the one or more configurable parameters to the compatible device.

DETAILED DESCRIPTION

As people move through their environment in their daily lives, they interact with countless computing devices. These devices can be categorized into families of systems, for example, dwelling, transportation, communication, etc. In many instances, the settings for personal preferences are the same within a family, for example, room temperature settings, regardless of whether the room is in a home or a hotel. Embodiments of the present invention recognize efficiency could be gained if these preferences are stored on a mobile computing device to interact with other computing devices and automatically communicate the users' preferred settings with little or no input from the user, initiating change without continuous interaction. Embodiments of the present invention store the preferred settings for use based on the situation and family rather than storing the settings for a specific computing device or system. Implementation of embodiments of the invention may take a variety of forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage medium(s) having computer readable program code/instructions embodied thereon.

Any combination of computer-readable storage media may be utilized. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
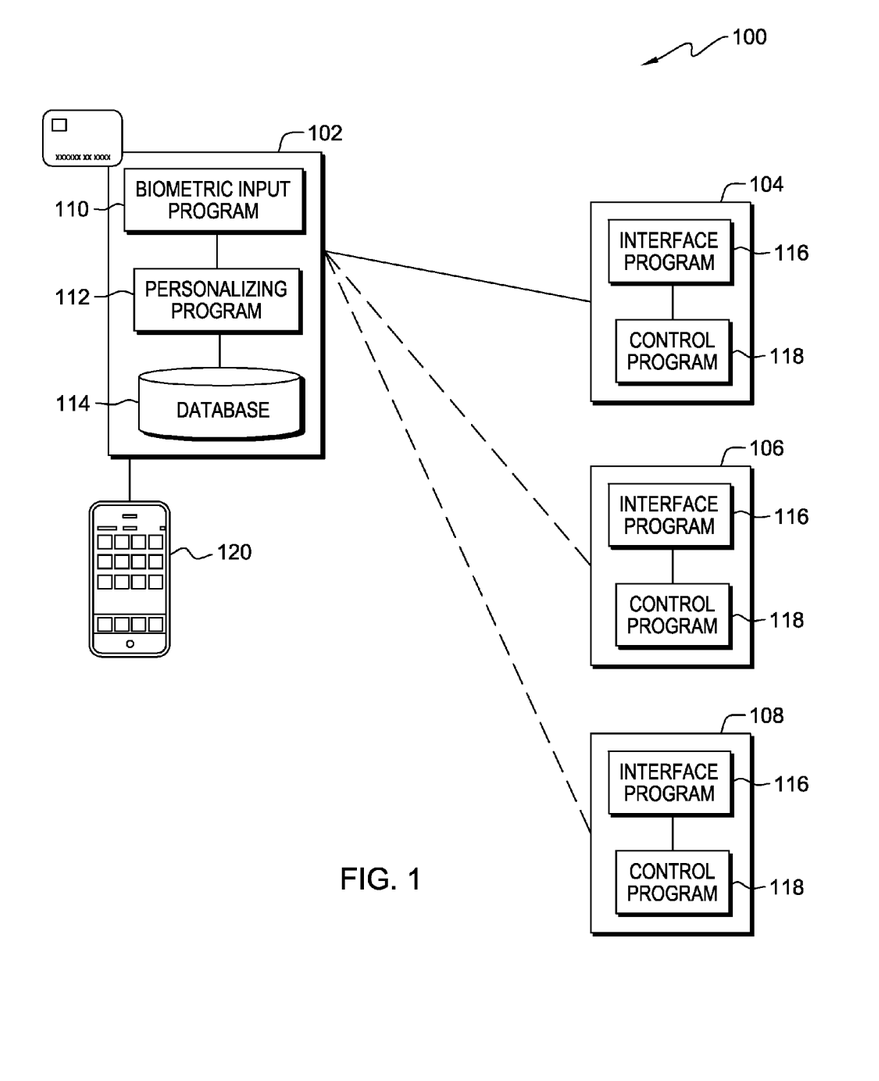
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, according to one embodiment of the present invention. FIG. 1 provides only an illustration of one implementation and does not imply any limitations with regard to the environments in which different embodiments may be implemented. Many modifications to the depicted environment may be made.

In the illustrated embodiment, distributed data processing environment 100 comprises a mobile computing device 102 proximately located with computing devices 104, 106 and 108. In one embodiment, mobile computing device 102 may wirelessly communicate with computing devices 104, 106, and 108 based on the respective distances of the computing devices. As depicted, mobile computing device 102 is communicatively coupled (e.g. within wireless communication range) to computing device 104, whereas computing devices 106 and 108 are out of a wireless communication range (as represented by the dashed line). In another embodiment, mobile computing device 102 may communicate directly with mobile device 120 and send and receive information to and from computing devices 104, 106, and 108 via mobile device 120. Mobile computing device 102 may be a smart phone, a tablet computer, a personal digital assistant, or any programmable electronic device capable of maintaining stored data and communicating with other computing devices.

Mobile computing device 102 may communicate with other computing devices using any wireless communications protocol, for example, Bluetooth®, NFC (Near Field Communications) protocols, RFID (radio-frequency identification), Wi-Fi®, or cellular communications. In an embodiment where mobile computing device 102 communicates with computing devices 104, 106, or 108 via mobile device 120, the mobile computing device may connect to mobile device 120 wirelessly (e.g., RFID) or via a wired connection, (e.g., a USB port). In general, any combination of connections and protocols that support communications between mobile computing device 102 and any of computing devices 104, 106, 108, and mobile device 120 may be used.

In one embodiment, personalizing program 112 resides on mobile computing device 102 and may continuously seek out devices and attempt to establish communication with any located device (e.g., computing devices 104, 106 and 108). Personalizing program 112 maintains user preferences, e.g., in database 114, and attempts to identify compatible devices within proximity to mobile computing device 102. Upon identification of a compatible device, personalizing program 112 may provide relevant preferences and parameters. A compatible device can receive parameters and make adjustments accordingly to match the preferences of the user of mobile computing device 102. Computing devices 104, 106, and 108 are representative of compatible devices. Examples of compatible devices include a laptop computer, a server computer, and programmable controlling device, such as a thermostat. Personalizing program 112 may additionally interact with biometric input program 110. Biometric input program 110 is a security program that may be used to confirm the user of mobile computing device 102 has the proper authorization to input and/or change the preferences stored in database 114. In one embodiment, biometric input program 110 may, for example, interact with an external fingerprint recognition device which can authenticate the user of mobile computing device 102 as the authorized user.

Each of computing devices 104, 106, and 108 may respectively be a programmable electronic device capable of performing any number of tasks or of controlling another device capable of performing any number of tasks. For example, computing device 104 may be a climate control device including a thermostat adjustable to the preferred temperature, as stored in database 114. In another example, computing device 106 can be an automobile computer controlling adjustments to a driver's seat location based on the preference stored in database 114. Computing devices 104, 106, and 108 may be referred to herein as "task devices." Computing device 104, 106, and 108 may each include an instance of interface program 116 and control program 118. Interface program 116 may respond to queries from mobile computing device 102 and interact with the respective instance of control program 118 to provide data communicated by personalizing program 112. Control program 118 adjusts the parameters of the computing device it resides in to match the preference data communicated by interface program 116.

Figure 2:
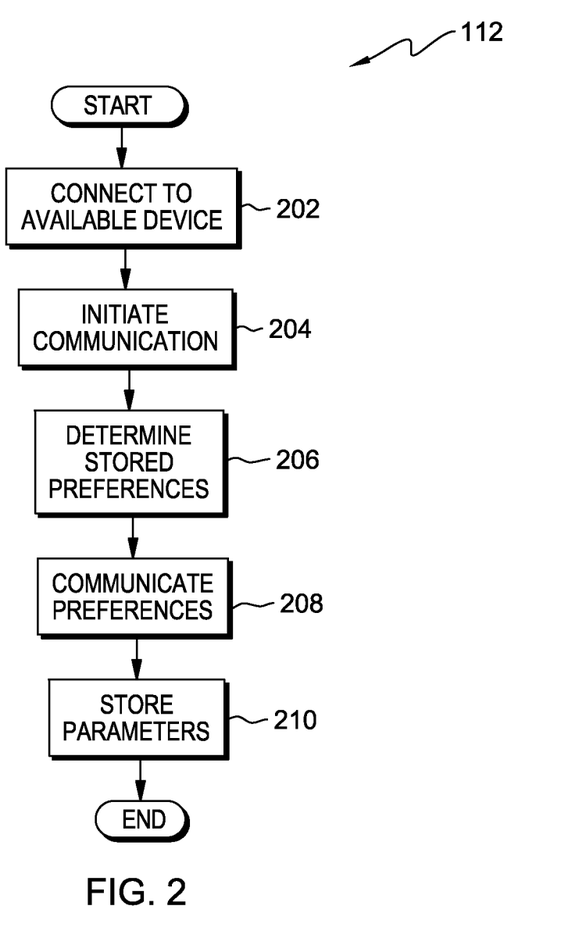
FIG. 2 is a high level process flow of the steps of a personalizing program, residing on a mobile computing device within the data processing environment of FIG. 1, for actively seeking out computing devices and determining whether there are features of located devices that can be configured with personal preference data, in accordance with an embodiment of the present invention.

FIG. 2 depicts a high level process flow taken by personalizing program 112 residing on mobile computing device 102. A more detailed implementation is discussed with regard to FIG. 3. Personalizing program 112 actively seeks out computing devices and determines whether located devices include features that can be configured with personal preference data. If personalizing program 112 finds a computing device, e.g., computing device 104, the personalizing program connects to the available device (step 202). In one embodiment, personalizing program 112 and computing device 104 connect via a wireless communications protocol (e.g., Bluetooth®, Wi-Fi®). In another embodiment the connection may be made using wired technologies such as USB.

Once connected, personalizing program 112 initiates communication with the computing device (step 204). For example, personalizing program 112 may query the computing device to determine whether the device can be configured to incorporate preferences of a user of mobile computing device 102. In one embodiment, personalizing program 112 may simply request identification. An incompatible device will respond with an error or not respond at all.

Upon receipt of a positive response from the computing device, personalizing program 112 determines whether stored preferences exist for this type of computing device (step 206). Subsequent to receiving a positive response from the computing device, personalizing program 112 communicates the user preferences to the computing device (step 208). If preferences for this type of computing device do not exist on mobile computing device 102, the task device can be manually configured to the preferences of the user of the mobile computing device. Personalizing program 112 can, in one embodiment, recognize and store the preferred parameters for use in the next instance of communication with this type of task device (step 210).

Figure 3:
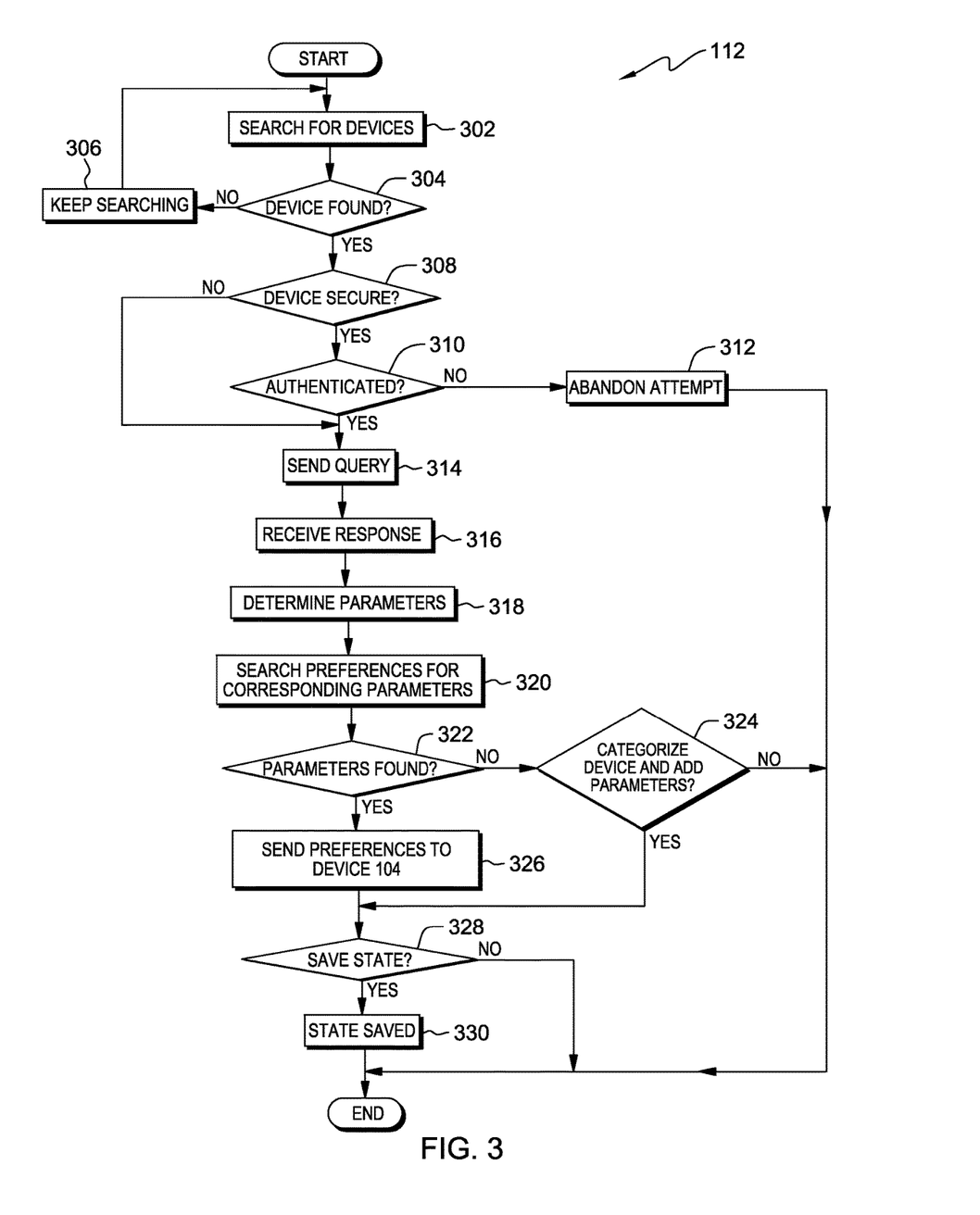
FIG. 3 is a flowchart depicting operational steps for one implementation of a personalizing program managing the data flow between a mobile computing device and a task device.

FIG. 3 depicts operational steps for one implementation of personalizing program 112 managing the data flow between mobile computing device 102 and a task device.

Personalizing program 112 seeks out computing devices with which it can interact (step 302). In one embodiment, personalizing program 112 uses a wireless communications protocol to search for an interactive computing device. Wireless connection may be made using technologies such as Bluetooth®, Wi-Fi® or cellular. For example, mobile computing device 102 may be a tablet enabled with Bluetooth® for short range wireless connection. In another embodiment, personalizing program 112 uses a wired communications protocol. For example, mobile computing device 102 may be a smart card with a micro-USB port that can be connected via cable to a compatible computing device. A smart card may be any pocket-sized card with embedded integrated circuits that can provide identification, authentication, data storage and/or application processing. As a user of mobile computing device 102 proceeds through the environment, the mobile computing device may continuously find computing devices as they come within range.

In an embodiment where mobile computing device 102 communicates with a task device via mobile device 120, the mobile computing device may periodically query mobile device 120 for devices accessible to and/or located by the mobile device.

If personalizing program 112 determines a computing device has not been found (no branch, decision block 304), the personalizing program continues to search (step 306). If personalizing program 112 finds a computing device, e.g., computing device 104 (a task device) or mobile device 120 (a user owned device that acts as a conduit between mobile computing device 102 and a task device) (yes branch, decision block 304), the personalizing program determines whether authentication must take place or whether any security requirements need to be met between mobile computing device 102 and the found computing device (decision block 308). For example, a task device such as computing device 104 may require security credentials, e.g., a user identification name and/or password. Such credentials may be sent directly from mobile computing device 102, or alternatively, may be sent via a keypad of mobile device 120. Acceptable security credentials may also be provided with either a hardware or a software authentication token. A hardware authentication token can be in the form of a device which offers two-factor authentication. In an example of two-factor authentication, the user supplies a personal identification number (PIN), which authorizes the user as the owner of the device. The device then displays a number which uniquely identifies the user to the computing device, allowing the user to log in. The identification number for each user changes frequently, for example every five minutes. The hardware authentication token can also be a physical token that connects directly to the task device (e.g., computing device 104). This type of token automatically transmits the authentication information to the client computer once a physical connection is made, via a USB port, for example, eliminating the need for the user to manually enter the authentication information. A software authentication token is stored within the computing device and can use public-key cryptography as a means of authentication where a PIN is required for access. As mentioned in FIG. 1, a biometric input device may be used for authentication of the user of mobile computing device 102. An example of a biometric input device is a fingerprint recognition sensor. In one embodiment, the user of mobile computing device 102 places a finger on the fingerprint recognition sensor of mobile computing device 102 in order to start personalizing program 112. Once biometric input program 110 recognizes the fingerprint, personalizing program 112 begins to scan for configurable computing devices.

An example of an instance where a task device would require the user to input security credentials prior to accepting a query is in the need for parental controls. If control program 118 in computing device 104 can configure settings in a home environment such as thermostat, television channel and/or security system enablement, the user of mobile computing device 102 may prefer that adjustment of those parameters only be initiated by adults in the household. Another example of an instance where a task device would require the user to input security credentials prior to accepting a query is in an industrial work environment. If computing device 104 were a robotic device that performs certain tasks, interface program 116 could require authentication of the user of mobile computing device 102 to confirm parameter adjustments are authorized.

In another embodiment, mobile computing device 102 may communicate directly with mobile device 120 (e.g., a user's cell phone), and send and receive information to and from computing device 104 via mobile device 120. In this instance, mobile device 120 may require the input of security credentials from mobile computing device 102 before attempting to connect to and/or query computing device 104. This may prevent other devices from accessing a user's personal device (e.g., cell phone) without permission. Security credentials could be input to mobile device 120 via wireless or wired communication protocol, as discussed above. In addition, computing device 104 may require the input of security credentials from mobile device 120. In that case, security credentials could be input to computing device 104 via wireless or wired communication protocol, as discussed above.

In another embodiment, mobile computing device 102 may require authentication from the task device, e.g., computing device 104, prior to proceeding with a query. For example, if computing device 104 is a computer in a hospital, computing device 104 might desire access to health records stored on mobile computing device 102 in database 114. Before allowing access to personal data, personalizing program 112 requires authentication from computing device 104 to confirm access to personal data is authorized. In another embodiment, authentication may be required by both mobile computing device 102 and computing device 104. In this case, the exchange of security credentials would flow in both directions.

Similarly, in an embodiment where mobile computing device 102 accesses task devices via mobile device 120, mobile computing device 102 may require authentication from mobile device 120.

If authentication is unsuccessful (no branch, decision block 310), personalizing program 112 abandons the attempt to query the task device (step 312).

If authentication is successful (yes branch, decision block 310), or alternatively if no authentication is required (no branch, decision block 308), personalizing program 112 sends a query to the task device, e.g., interface program 116 of computing device 104 (step 314). In one embodiment, personalizing program 112 may query interface program 116 to determine the identity of computing device 104 and/or whether it has any configurable parameters.

In step 316 the personalizing program receives a response from interface program 116 of computing device 104. A valid response indicates computing device 104 is compatible with the communications protocol used by mobile computing device 102. The response may also include the identity of computing device 104 and/or configurable parameters of computing device 104. The identity of computing device 104 may correspond to a category stored in database 114. Database 114 is comprised of a high level taxonomy which categorizes families of systems and/or devices with which mobile computing device 102 may come in contact. This method allows abbreviation or encoding to describe the system type which economizes computing resources. Personalizing program 112 remembers systems based on the taxonomy which allows similar devices to be set even if not identical to those already stored in database 114. Personalizing program 112 can also allow multiple systems from different families to be accessed simultaneously. This allows personalizing program 112 to infer settings across system family boundaries. For example, information which is relevant when using a cell phone can also be used for a soft phone on a computer. Examples of categories within database 114 are transportation, dwelling, security, automation, computing, communication, reference, education, entertainment, and any other categories the user of mobile computing device 102 might find convenient. In one embodiment, a task device may identify a category to which it is a member. In another embodiment, upon first communication with a previously unknown device, a user may place it into a category. In another embodiment still, personalizing program 112 may determine a category based on communication of configurable parameters between the task device and categories or devices known to mobile computing device 102. The taxonomy of database 114 may also include device types which may be more specific than the device families previously discussed. For example, a device may identify itself as a thermostat. Personalizing program 112 may determine to which family or families this device type belongs based on other device types stored in database 114. If the device type provided is "thermostat," personalizing program 112 can choose from families such as "dwelling" and/or "transportation" which include device type "thermostat" for the corresponding preferred parameter value, i.e. temperature.

In one embodiment, database 114 is not comprised of a predetermined taxonomy. The user of mobile computing device 102 may assign categories according to personal preferences of the desired devices to be configured. The desired categories may be input in many ways, for example, via the keypad of mobile device 120. In another embodiment, personalizing program 112 may create categories based on learning configurable parameters as it interacts with various compatible devices. The categories could be grouped by computing device identity or by the individual parameters, or by a combination of the two. Once personalizing program creates a category, subsequent interactions with similar devices would result in the communication of parameters stored in database 114, as described previously. In one embodiment, personalizing program 112 may test the threshold of a category match. Personalizing program 112 may calculate the percentage of parameters received from a compatible device that match parameters already stored in database 114 in a particular category. If the percentage of parameters from the compatible device that match parameters in a particular category of database 114 is equal to or greater than the defined threshold percentage, then the matching parameters and possibly the device identity are stored in that category.

In step 318 personalizing program 112 determines the parameters control program 118 can configure within computing device 104. The determination of the parameters that can be configured by control program 118 may be indicated by a match of the identity of computing device 104 to a category stored in database 114. In one example, computing device 104 may be an automobile computer, and the parameters control program 118 can adjust include the location of the driver's seat, the cabin temperature, and the radio station. In another example, computing device 104 may correspond to the home of the user of mobile computing device 102, and the parameters control program 118 can adjust include the room temperature, the preferred television station and whether or not the security system should be enabled. The units of measure and range of the adjustable settings may be included in the response or determined based on identity/category.

In step 320 personalizing program 112 searches the preferences stored in database 114 for parameters that correspond to the configurable parameters of computing device 104. If, for example, the configurable parameters in control program 118 are the aforementioned automobile settings, personalizing program 112 searches within the category or family "Transportation" in database 114 for stored preferences for driver's seat location, cabin temperature and preferred radio station. In a second example, if the configurable parameters in control program 118 are for the user's home, personalizing program 112 searches within the category or family "Dwelling" in database 114 for stored preferences for room temperature, television station and security system. In one embodiment, the configurable parameters in control program 118 are temperature and television station, however computing device 104 resides in a hotel room. Personalizing program 112 may recognize these parameters as the same as those stored in database 114 in category "Dwelling". Although the device identity may be different from the user's home, the configurable parameters are a match.

If personalizing program 112 finds the stored preferences in database 114 (yes branch, decision block 322), the personalizing program sends the preferences to computing device 104 (step 326). Personalizing program 112 preferably sends the preferences in comparable units of measure as were provided by computing device 104. For example, if the configurable parameter is temperature, the preference can be sent in degrees Fahrenheit.

In one embodiment, if personalizing program 112 does not find the stored preferences in database 114 matching the parameters that can be accepted by computing device 104 (no branch, decision block 322), the personalizing program determines whether computing device 104 and its associated configurable parameters should be added to database 114 (decision block 324). In a preferred embodiment, mobile computing device 102 seeks input from a user to make the determination. In one implementation, mobile computing device 102 may display a query to the user (e.g., via a display device or mobile device 120) and receive input from the user in response. In another implementation, no indication is given to the user, and a positive input must be received by personalizing program 112 to store parameters. In such an implementation, no action may indicate the parameters should not be added to database 114. If personalizing program 112 determines computing device 104 and its associated configurable parameters should not be added to database 114 (no branch, decision block 324), the program may end. For example, the user of mobile computing device 102 may come in contact with a computing device the user knows is a one-time interaction. In that case, storing preferences in database 114 is not desired since the data consumes storage space and is not retrieved.

If personalizing program 112 determines computing device 104 and associated configurable parameters should be added to database 114 (yes branch, decision block 324), the personalizing program can choose a category in which to store the parameters based on either the identity of the computing device or the similarity of the parameters themselves to other parameters stored in the database. Personalizing program 112 can learn the parameters from computing device 104 in a variety of ways. In one embodiment, the parameters are manually set on computing device 104. In one implementation, a button (or other user input feature) on mobile computing device 102 may, in various embodiments, be pressed directly before the parameters are set, during the setting of the parameters, or after the parameters are set. The action of holding the button instructs personalizing program 112 to accept the parameters from computing device 104 through a wireless communication protocol such as Bluetooth®. Take, for example, a thermostat. To set temperature parameters in mobile computing device 102, in one embodiment, the mobile computing device has a "set" button. A user may press and hold the set button while manually setting temperature on the thermostat. Personalizing program 112 on mobile computing device 102 may, responsive to the button being held, seek out the device (e.g., the thermostat), and query the device as to parameters of the device and the settings of the parameters. The existing values of the parameters at the time the user releases the button may cause the parameters to be stored in database 114 corresponding to the identity or category of the thermostat. In another embodiment, the keypad of mobile device 120, which is connected to mobile computing device 102, can be used to input the parameters set on computing device 104 into database 114 on the mobile computing device. If the new settings do not fit into any of the currently established categories in database 114, a new category can be created. In one embodiment, the editing of the list of categories that resides in database 114 can be done via wireless communication between mobile computing device 102 and mobile device 120 via the keypad on the mobile device.

In decision block 328 personalizing program 112 can give the user of mobile computing device 102 the option to save the current state. If the user of mobile computing device 102 prefers not to save the current state in database 114 (no branch, decision block 328), the program ends. If the user of mobile computing device 102 prefers to save the current state, personalizing program 112 saves the identity and parameters of computing device 104 in database 114 (step 330). After saving the current state, the program ends.

Figure 4:
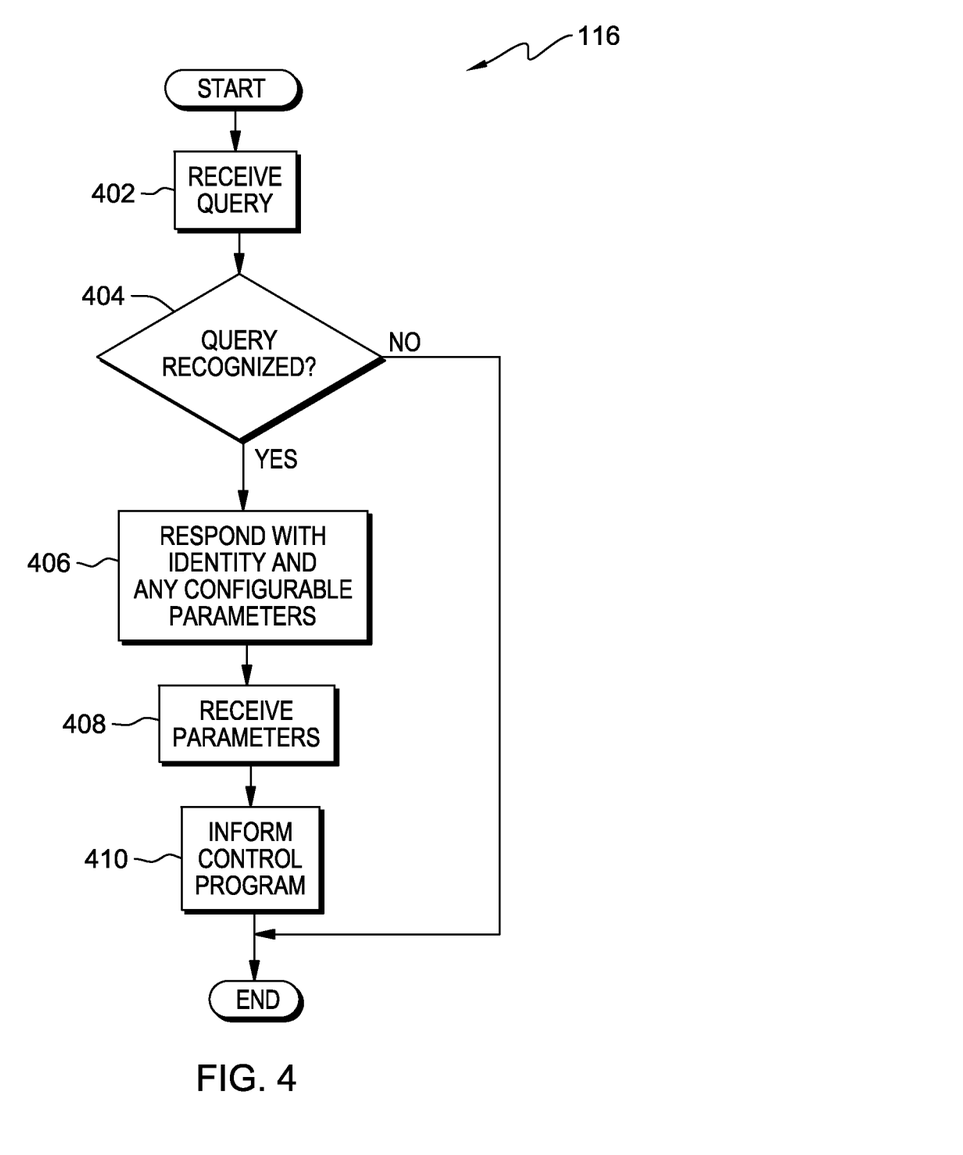
FIG. 4 illustrates operational steps of an interface program, inserted on a task device within the data processing environment of FIG. 1, in accordance with an embodiment of the present invention.

FIG. 4 depicts operational steps for one implementation of interface program 116 managing the data flow between computing device 104 and mobile computing device 102.

Interface program 116 begins by receiving a query from personalizing program 112 (step 402). The received query is a request for the identity of computing device 104 and any configurable parameters controlled by control program 118. Interface program 116 determines whether the query from personalizing program 112 is recognized (decision block 404). If interface program 116 does not recognize the query from personalizing program 112 (no branch, decision block 404), then the program ends.

If interface program 116 does recognize the query from personalizing program 112 (yes branch, decision block 404), then the interface program responds with the identity of computing device 104 and, potentially, a list of configurable parameters (step 406). In one embodiment, the response occurs subsequent to any authorization proceedings between mobile computing device 102 and computing device 104. In another embodiment, the query may trigger such authorization proceedings.

If personalizing program 112 communicates preferences that match the configurable parameters specified by interface program 116 and/or corresponding to a communicated device identity, the interface program receives the preferred parameters (step 408). Subsequent to the receipt of the parameters, interface program 116 informs control program 118 to adjust the parameters to match the preferences received by the interface program from personalizing program 112 (step 410).

Figure 5:
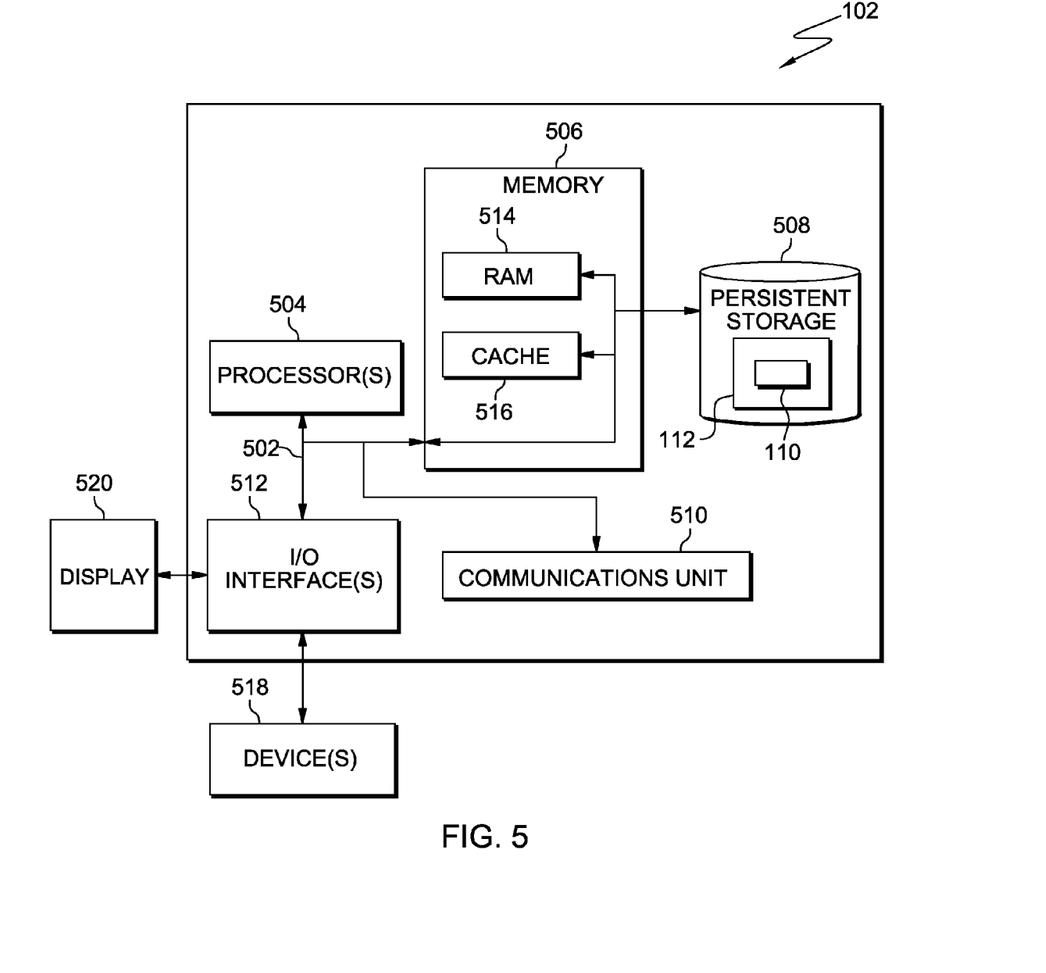
FIG. 5 depicts a block diagram of components of the mobile computing device executing the personalization program, in accordance with an embodiment of the present invention.

FIG. 5 depicts a block diagram of components of mobile computing device 102 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Mobile computing device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Biometric input program 110, personalizing program 112, and database 114 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of mobile device 120 and computing devices 104, 106, and 108. In these examples, communications unit 510 includes one or more network interface cards. Communications unit 510 may provide communications through the use of either or both physical and wireless communications links. Biometric input program 110 and personalizing program 112 may be downloaded to persistent storage 508 through communications unit 510.

I/O interface(s) 512 allows for input and output of data with other devices that may be connected to mobile computing device 102. For example, I/O interface 512 may provide a connection to external devices 518 such as a keyboard, keypad, a touch screen, and/or some other suitable input device. Devices 518 can also include portable computer-readable storage media such as, for example, thumb drives, portable optical or magnetic disks, and memory cards. Software and data used to practice embodiments of the present invention, e.g., biometric input program 110 and personalizing program 112, can be stored on such portable computer-readable storage media and can be loaded onto persistent storage 508 via I/O interface(s) 512. I/O interface(s) 512 may also connect to a display 520.

Display 520 provides a mechanism to display data to a user and may be, for example, a touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising the steps of:
a mobile computing device querying a first device for identification information via a network;
the mobile computing device determining, based on the identification information, the first device is compatible with the mobile computing device;
based on received identification information, the mobile computing device comparing one or more parameters of the first device that can be configured, received as identification information, to one or more family parameters stored in the mobile computing device for each family of devices of a plurality of families of devices;
the mobile computing device determining a family of devices, from the plurality of families, to which the first device is a member, based on matches between the one or more family parameters and the one or more parameters of the first device and based, at least in part, on a stored taxonomy of the plurality of families, wherein the taxonomy allows the a plurality of devices from the plurality of families to be accessed simultaneously such that one or more settings are inferred across each of the plurality of families, and includes each device in a family of devices associated with each other device in the family of devices according to a category of device, and wherein the family of devices to which the first device is a member is identified based on at least one of the category of device and a device type;
based on the determined family of devices, the mobile computing device determining the one or more family parameters associated with the determined family of devices;
based on the determined one or more family parameters, the mobile computing device comparing the one or more parameters of the first device to the one or more family parameters to determine one or more configurable parameters of the first device, wherein the one or more configurable parameters include settings of the first device that are adjusted to include one or more stored values corresponding to preferences of a user, and wherein the one or more configurable parameters match the one or more family parameters of the family of devices; and responsive to determining the one or more configurable parameters of the first device, the mobile computing device sending the one or more stored values corresponding to the one or more configurable parameters of the first device to the first device via the network, wherein the one or more configurable parameters of the first device are adjusted to match the one or more stored values.

2. The method of claim 1 wherein each of the devices in the family of devices is grouped based on similarity of family parameters.

3. The method of claim 1, further comprising the steps of: prior to querying the first device for the identification information:
the mobile computing device querying a mobile electronic device remaining, at least temporarily, within proximity to the mobile computing device for any devices identified by the mobile electronic device, wherein the mobile computing device is authorized to access the mobile electronic device, and wherein the mobile electronic device is capable of wirelessly communicating with the first device; and
the mobile computing device identifying the first device from the devices identified by the mobile electronic device; and
wherein querying the first device for the identification information comprises querying the first device via the mobile electronic device.

4. The method of claim 1, wherein the identification information comprises at least one of: a device type, a device family, a category, and one or more configurable parameters.

5. The method of claim 1, wherein determining the family of devices to which the first device is a member comprises the steps of:
determining that the first device, based on the received identification information, is not a member of a family of devices on the mobile computing device; and creating another family of devices for the first device.

6. The method of claim 1, further comprising the steps of:
the mobile computing device querying a second device for identification information; based on the identification information for the second device, the mobile computing device determining a family of devices, from the plurality of families, to which the second device is a member;
in response to an external input, the mobile computing device receiving, from the second device, current values for configurable parameters of the second device; and
the mobile computing device storing the current values on the mobile computing device corresponding with the configurable parameters.

7. A computer program product comprising:
one or more computer-readable storage device and program instructions stored on the one or more computer-readable storage device, the stored program instructions comprising:
program instructions to query a first device for identification information via a network; program instructions to determine, based on the identification information, the first device is compatible with the mobile computing device;
program instructions to, based on received identification information, compare one or more parameters of the first device that can be configured, received as identification information, to one or more family parameters stored in the mobile computing device for each family of devices of a plurality of families of devices;
program instructions to determine a family of devices, from the plurality of families, to which the first device is a member, based on matches between the one or more family parameters and the one or more parameters of the first device and based, at least in part, on a stored taxonomy of the plurality of families, wherein the taxonomy allows a plurality of devices from the plurality of families to be accessed simultaneously such that one or more settings are inferred across each of the plurality of families, and includes each device in a family of devices associated with each other device in the family of devices according to a category of device, and wherein the family of devices to which the first device is a member is identified based on at least one of the category of device and a device type;
program instructions to, based on the determined family of devices, determine the one or more family parameters associated with the determined family of devices;
program instructions to, based on the determined one or more family parameters, compare the one or more parameters of the first device to the one or more family parameters to determine one or more configurable parameters of the first device, wherein the one or more configurable parameters include settings of the first device that are adjusted to include one or more stored values corresponding to preferences of a user, and wherein the one or more configurable parameters match the one or more family parameters of the family of devices; and
responsive to determining the one or more configurable parameters of the first device, program instructions to send the one or more stored values corresponding to the one or more configurable parameters of the first device to the first device via the network, wherein the one or more configurable parameters of the first device are adjusted to match the one or more stored values.

8. The computer program product of claim 7, further comprising:
program instructions stored on the one or more computer-readable storage device wherein each of the plurality of families groups devices based on similarity of configurable family parameters.

9. The computer program product of claim 7, further comprising: program instructions, stored on the one or more computer-readable storage device to, prior to querying the first device for identification information, query a mobile electronic device remaining, at least temporarily, within proximity to a mobile computing device, executing the computer program product, for any devices identified by the mobile electronic device, wherein the mobile computing device is authorized to access the mobile electronic device, and wherein the mobile electronic device is capable of wirelessly communicating with the first device;
program instructions stored on the one or more computer-readable storage device to identify the first device from the devices identified by the mobile electronic device; and
program instructions stored on the one or more computer-readable storage device to query the first device via the mobile electronic device.

10. The computer program product of claim 7, wherein the identification information comprises at least one of: a device type, a device family, a category, and one or more configurable parameters.

11. The computer program product of claim 7, further comprising: program instructions stored on the one or more computer-readable storage device to determine that the first device, based on the received identification information, is not a member of a family of devices on the mobile computing device; and
program instructions stored on the one or more computer-readable storage device to create another family of devices for the first device.

12. The computer program product of claim 7, further comprising:
program instructions stored on the one or more computer-readable storage device to query a second device for identification information;
program instructions stored on the one or more computer-readable storage device to, based on the identification information for the second device, determine a family of devices, from the plurality of families, to which the second device is a member;
program instructions stored on the one or more computer-readable storage device to, in response to an external input, receive, from the second device, current values for configurable parameters of the second device; and
program instructions stored on the one or more computer-readable storage device save the current values on the mobile computing device corresponding with the configurable parameters.

13. A computer system comprising: one or more computer processors;
one or more computer-readable storage device;
program instructions stored on the computer-readable storage device for execution by at least one of the one or more processors, the program instructions comprising:
program instructions to query a first device for identification information via a network; program instructions to determine, based on the identification information, the first device is compatible with the mobile computing device;
program instructions to, based on received identification information, compare one or more parameters of the first device that can be configured, received as identification information, to one or more family parameters stored in the mobile computing device for each family of devices of a plurality of families of devices;
program instructions to determine a family of devices, from the plurality of families, to which the first device is a member, based on matches between the one or more family parameters and the one or more parameters of the first device and based, at least in part, on a stored taxonomy of the plurality of families, wherein the taxonomy allows a plurality of devices from the plurality of families to be accessed simultaneously such that one or more settings are inferred across each of the plurality of families, and includes each device in a family of devices associated with each other device in the family of devices according to a category of device, and wherein the family of devices to which the first device is a member is identified based on at least one of the category of device and a device type;
program instructions to, based on the determined family of devices, determine the one or more family parameters associated with the determined family of devices;
program instructions to, based on the determined one or more family parameters, compare the one or more parameters of the first device to the one or more family parameters to determine one or more configurable parameters of the first device, wherein the one or more configurable parameters include settings of the first device that are adjusted to include one or more stored values corresponding to preferences of a user, and wherein the one or more configurable parameters match the one or more family parameters of the family of devices; and
responsive to determining the one or more configurable parameters of the first device, program instructions to send the one or more stored values corresponding to the one or more configurable parameters of the first device to the first device via the network, wherein the one or more configurable parameters of the first device are adjusted to match the one or more stored values.

14. The computer system of claim 13, further comprising:
program instructions stored on the one or more computer-readable storage device for execution by at least one of the one or more computer processors to: query a second device for identification information;
based on the identification information for the second device, determine a family of devices, from the plurality of families, to which the second device is a member;
in response to an external input, receive, from the second device, current values for configurable parameters of the second device; and
store the current values on the computer system corresponding with the configurable parameters.

15. The method of claim 1, wherein determining the family of devices based on matches between the one or more family parameters and the one or more parameters of the first device further comprises the steps of:
calculating a percentage of configurable parameters received from the first device that match configurable parameters of one or more families; and
determining whether the percentage of matching configurable parameters is equal to or greater than a predefined threshold percentage.

16. The method of claim 1, wherein determining the family of devices to which the first device is a member comprises the step of receiving an identification of a family from the first device.

17. The method of claim 1, wherein determining the family of devices to which the first device is a member comprises the step of receiving an identification of a family from a user of the first device.

* * * * *